US012199387B1

(12) United States Patent
Zeng et al.

(10) Patent No.: US 12,199,387 B1
(45) Date of Patent: Jan. 14, 2025

(54) OVERLOAD PREVENTION DEVICE FOR MULTI-COUNTRY POWER CONVERTER

(71) Applicants: Guangli Zeng, Guangdong (CN); Chengbing Wang, Guangdong (CN); Feng Wang, Guangdong (CN)

(72) Inventors: Guangli Zeng, Guangdong (CN); Chengbing Wang, Guangdong (CN); Feng Wang, Guangdong (CN)

( * ) Notice: Subject to any disclaimer, the term of this patent is extended or adjusted under 35 U.S.C. 154(b) by 0 days.

(21) Appl. No.: 18/798,939

(22) Filed: Aug. 9, 2024

(51) Int. Cl.

| | |
|---|---|
| ***H01R 13/00*** | (2006.01) |
| ***H01R 13/66*** | (2006.01) |
| ***H01R 13/688*** | (2011.01) |
| ***H01R 31/06*** | (2006.01) |

(52) U.S. Cl.
CPC ....... *H01R 13/688* (2013.01); *H01R 13/6675* (2013.01); *H01R 31/065* (2013.01)

(58) Field of Classification Search
CPC . H01R 13/688; H01R 13/6675; H01R 31/065
See application file for complete search history.

(56) References Cited

U.S. PATENT DOCUMENTS

| | | | | |
|---|---|---|---|---|
| 11,348,745 B1 * | 5/2022 | Bishel | .................... | H01H 9/54 |
| 2005/0102043 A1 * | 5/2005 | Menas | .................... | H01R 27/02 307/116 |
| 2024/0243537 A1 * | 7/2024 | Zeng | .................... | H01R 13/629 |

* cited by examiner

*Primary Examiner* — Phuong Chi Thi Nguyen

(57) ABSTRACT

The present utility model discloses an overload prevention device for a multi-country power converter, the UK-standard pin assembly and the US-standard pin assembly are respectively connected with the lower conductive piece in a plug-in manner; the upper conductive piece comprises an clamping part of the upper conductive piece capable of clamping and conducting the upper part of the fuse tube; and the upper conductive piece is electrically connected to the socket hole. It is easy to pull out and mount the utility model. The structure is stable after being mounted. The conduction is smooth and the safety is high, which effectively protects the circuit of the power converter to prevent overload of the circuit and the problem of people pulling out incorrectly during use. The volume of the product can also be made smaller.

8 Claims, 15 Drawing Sheets

OVERLOAD PREVENTION DEVICE FOR MULTI-COUNTRY POWER CONVERTER

CROSS-REFERENCE TO RELATED APPLICATIONS

This application claims priority benefits to Chinese Patent Application No. 202311717256X, filed on Dec. 13, 2023, the contents of which are incorporated herein by reference.

TECHNICAL FIELD

The present utility model relates to the technical field of power converters, and particularly relates to an overload prevention device for multi-country power converters.

BACKGROUND ART

Since the standards for the sockets in each country are not completely uniform, a plug cannot be universally used all over the world. When people go to different countries, it is necessary to configure a plug corresponding to the country so as to supply power for portable electronic devices. If going to several countries at a time, consumers have to take power plugs corresponding to several countries, which causes great trouble for people who travel across countries or have a business travel.

Therefore, there are power converters available on the market that can be applied to different national socket standards. In order to improve the safety performance of these power converters, some power converters will be provided with a fuse tube. When the current reaches a certain value, the fuse tube will be fused, thereby protecting the circuit.

The conventional power converter on the market is provided with a plug hole on the shell, and a conductive terminal is provided through the side wall of the plug hole to be in electrical contact with the fuse tube, so that it is easy to generate electrical leakage during use, thus resulting in electric shock, which causes a potential safety hazard. It also occupies a product space, which is not conducive to miniaturization of the product.

In addition, during the use of the power converter, since there is no safety requirement for the outer edge dimension of the socket in some countries, there will be many sockets on the market with a relatively small distance for the outer edge dimension of the socket. When a pin is pushed out for use, if the fuse tube is not completely placed in the contact surface between the plug and the socket, the fuse tube will have the risk of being pulled out, resulting in the risk of leakage and electric shock. In particular, when children pull out the fuse tube under the condition of being naughty during the use, there will be great safety problems and low safety in use.

Summary of the Utility Model

In view of the above-mentioned deficiencies, the object of the present utility model is to provide an overload prevention device for a multi-country power converter. It is easy to pull out and mount the utility model. The structure is stable after being mounted. The conduction is smooth and the safety is high, which effectively protects the circuit of the power converter to prevent overload of the circuit and the problem of people pulling out incorrectly during use. The volume of the product can also be made smaller.

The technical solution adopted by the utility model for achieving the above purpose is as follows.

An overload prevention device for a multi-country power converter comprises an upper cover of a main body, a lower cover of the main body covered on the upper cover of the main body, a US-standard pin assembly disposed between the upper cover of the main body and the lower cover of the main body, and a UK-standard pin assembly disposed between the upper cover of the main body and the lower cover of the main body, wherein at least one socket hole is formed on the upper cover of the main body, wherein the device further comprises a fuse holder detachably mounted in the lower cover of the main body, a fuse tube mounted in the fuse holder, a lower conductive piece fixed on the lower cover of the main body, and an upper conductive piece fixed between the upper cover of the main body and the lower cover of the main body; a mounting frame is formed in the fuse holder, and the fuse tube is mounted in the mounting frame; the lower conductive piece comprises a clamping part of the lower conductive piece capable of clamping and conducting the lower part of the fuse tube; the UK-standard pin assembly and the US-standard pin assembly are respectively connected with the lower conductive piece in a plug-in manner; the upper conductive piece comprises an clamping part of the upper conductive piece capable of clamping and conducting the upper part of the fuse tube; the upper conductive piece is electrically connected to the socket hole; a mounting cover is formed on a lower end surface of the fuse holder, at least one mounting limit part extends outwards on a side edge of the mounting cover, and a pull-out guide surface extending obliquely outwards and downwards from the mounting plate is formed on an upper end surface of the mounting limit part; the lower cover of the main body is provided with a fuse tube insertion hole matched with the mounting cover and the mounting limit part, and at least one pulling-out avoidance groove is recessed on a side edge of the fuse tube insertion hole; and the mounting frame has a rectangular or circular arc shape as a whole.

As a further improvement of the present utility model, the lower conductive piece further comprises a connection piece of the lower conductive piece, a US-standard clamping part disposed at one end of the connection piece of the lower conductive piece and capable of being inserted and electrically connected to the US-standard pin assembly, and a UK-standard clamping part disposed at the other end of the connection piece of the lower conductive piece and capable of being inserted and electrically connected to the US-standard pin assembly; and the clamping part of the lower conductive piece is disposed at the other end of the connection piece of the lower conductive piece.

As a further improvement of the present utility model, the clamping part of the lower conductive piece comprises a clamping arm of the lower conductive piece which respectively clamps two sides of the lower part of the fuse tube; the upper end of the clamping arm of the lower conductive piece is formed with an upper guide block of the lower conductive piece which extends obliquely towards the outer upper end; and the lower end of the clamping arm of the lower conductive piece is formed with a lower guide block of the lower conductive piece which extends obliquely towards the outer lower end.

As a further improvement of the present utility model, the upper conductive piece further comprises a connection piece of the upper conductive piece which is of a "L" type as a whole, and a socket hole connection clamping part disposed at one end of the connection piece of the upper conductive piece and being electrically connected to the socket hole;

and the clamping part of the upper conductive piece is disposed at the other end of the connection piece of the upper conductive piece.

As a further improvement of the present utility model, the clamping part of the upper conductive piece comprises an clamping arm of the upper conductive piece respectively clamping two sides of the upper part of the fuse tube and extending integrally downwards; and the lower part of the clamping arm of the upper conductive piece is formed with at least one guide block of the upper conductive piece extending obliquely towards the outer lower end.

As a further improvement of the present utility model, a mounting cover is formed on a lower end surface of the fuse holder, at least one mounting limit part extends outwards on a side edge of the mounting cover, and a pull-out guide surface extending obliquely outwards and downwards from the mounting plate is formed on an upper end surface of the mounting limit part; the lower cover of the main body is provided with a fuse tube insertion hole matched with the mounting cover and the mounting limit part; and at least one pulling-out avoidance groove is recessed on a side edge of the fuse tube insertion hole.

As a further improvement of the present utility model, the mounting frame has a rectangular or circular arc shape as a whole.

As a further improvement of the present utility model, the inner wall of the mounting frame is convexly provided with at least one set of inner limit protrusions arranged symmetrically; a side edge of the fuse tube presses against the inner limit protrusion; a lower limit protrusion is respectively protruded at two ends of the outer side of the lower part of the mounting frame; and the lower end of the fuse tube presses against the lower limit protrusion.

As a further improvement of the present utility model, a US-standard live wire conductive piece is disposed on the US-standard pin assembly; and the US-standard live wire conductive piece is inserted into the US-standard clamping part when the US-standard pin assembly is pushed out of the lower cover of the main body.

As a further improvement of the present utility model, a UK-standard live wire conductive piece is disposed on the UK-standard pin assembly; and the UK-standard live wire conductive piece is inserted into the UK-standard clamping part when the UK-standard pin assembly is pushed out of the lower cover of the main body.

The utility model has the following beneficial effects.

The fuse holder is used for protecting and limiting the fuse tube. After the fuse holder and the fuse tube are mounted in the power converter, an clamping part of the upper conductive piece in the upper conductive piece clamps the upper part of the fuse tube, so that one end of the fuse tube is connected to a live wire at one end of the socket hole of the power converter. The lower side surface of the fuse tube is clamped by a clamping part of the lower conductive piece in the lower conductive piece, so that the other end of the fuse tube is connected to the live wires of the US-standard pin assembly and the UK-standard pin assembly in the power converter, and the two are combined. Thus, the present anti-electric shock device conducts smoothly and has high safety, and effectively protects the circuit of the power converter and prevents the circuit from being overloaded.

The fuse tube is correspondingly mounted on the fuse tube insertion hole, and matched with a pulling-out avoidance hole on the side of the fuse tube insertion hole, so that the fuse tube is more convenient in pulling out and mounting.

The above mentioned is an overview of the technical scheme of the utility model. The following is a further explanation of the utility model in combination with the attached drawings and specific implementations.

Figure 1:
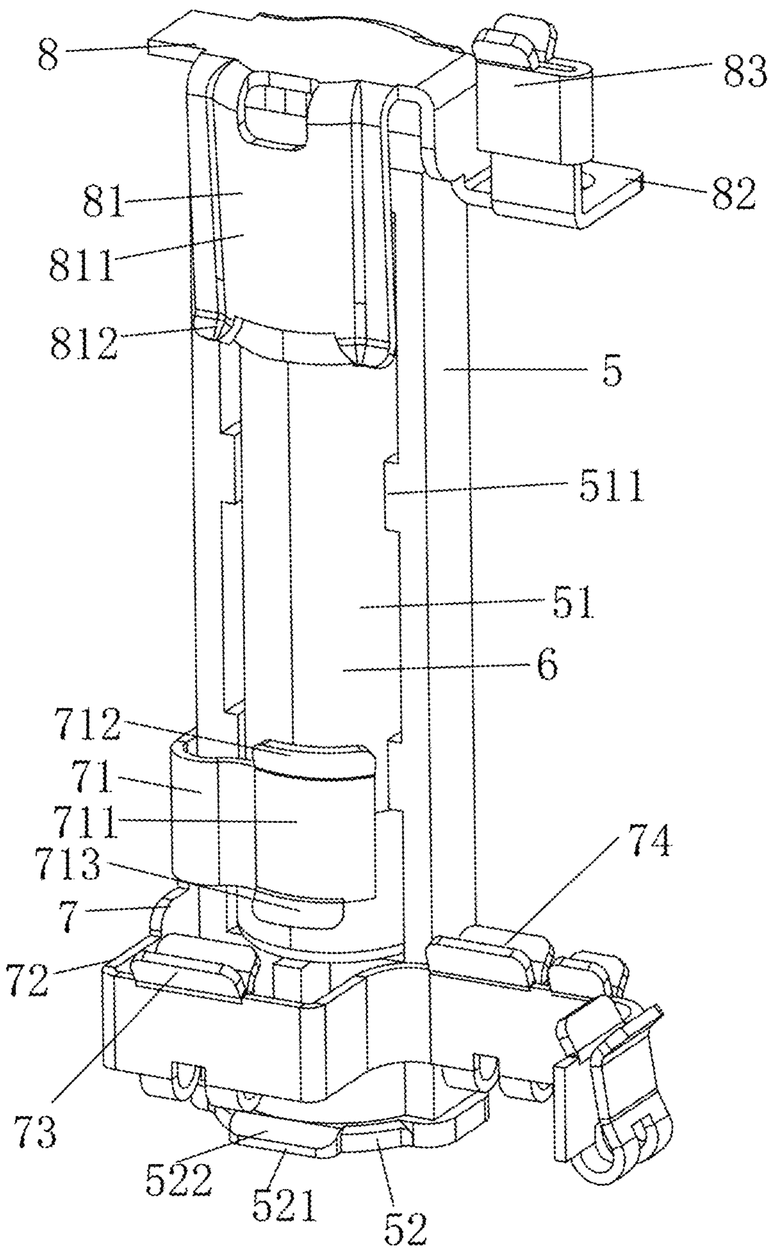
FIG. 1 is a schematic structural view of a fuse tube, a fuse holder, an upper conductive piece, and a lower conductive piece.

In the drawings, 1, upper cover of main body; 11, socket hole; 2, lower cover of main body; 21, fuse tube insertion hole; 22, pulling-out avoidance groove; 3, US-standard pin assembly; 31, US-standard live wire conductive piece; 4, UK-standard pin assembly; 41, UK-standard live wire conductive piece; 5, fuse holder; 51, mounting frame; 511, inner limit protrusion; 512, lower limit protrusion; 52, mounting cover; 521, mounting limit part; 522, pulling-out conductive surface; 6, fuse tube; 7, lower conductive piece; 71, clamping part of lower conductive piece; 711, clamping arm of lower conductive piece; 712, upper guide block of lower conductive piece; 713, lower guide block of lower conductive piece; 72, connection piece of lower conductive piece; 73, US-standard clamping part; 74, UK-standard clamping part; 8, upper conductive piece; 81, clamping part of upper conductive piece; 811, clamping arm of upper conductive piece; 812, guide block of upper conductive piece; 82, connection piece of upper conductive piece; 83, socket hole connection clamping part.

DETAILED DESCRIPTION

In order to further explain the technical means and effects of the present utility model for achieving the intended purpose, the following detailed description of the embodiments of the present utility model will be made with reference to the accompanying drawings and preferred embodiments.

In the description of the present utility model, it should be understood that the directional or positional relationships indicated by the terms “length”, “width”, “height”, “up”, “down”, “before”, “after”, “left”, “right” and “vertical”, "level", "top", "bottom", "inside", "outside" and the like are based on the directional or positional relationships shown in the drawings. It is merely for the purpose of describing the present utility model and simplifying the description, and is not intended to indicate or imply that a particular orientation, configuration and operation of the referenced device or element is required and should not be construed as limiting the scope of the present utility model.

Furthermore, the terms "first" and "second" are used for descriptive purposes only and are not to be construed as indicating or implying relative importance or implicitly indicating the number of technical features indicated. Thus, a feature defined by "first" or "second" may explicitly or implicitly include one or more such features. In the description of the present utility model, the meaning of "a plurality" is two or more, unless specifically and specifically limited otherwise.

In the utility model, unless expressly stated or limited otherwise, the terms "mounted", "connected", "connecting", "fixed", and the like are to be interpreted broadly, e.g., either fixedly or detachably, or integrally connected. It may be a mechanical connection or an electrical connection. It may be a direct connection or indirect connection by an intermediary. It may be a communication between two elements, or may be in an interactive relationship between two elements, unless explicitly defined otherwise. The specific meaning of the above terms in the present utility model will be understood in specific circumstances by those of ordinary skill in the art.

Example 1

With reference to FIGS. 1 to 14, the embodiment of the present utility model provides an overload prevention device for a multi-national power converter, including an upper cover of a main body 1, a lower cover of the main body 2 covered on the the upper cover 1 of the main body, a US-standard pin assembly 3 disposed between the upper cover of the main body 1 and the lower cover of the main body 2, and a UK-standard pin assembly 4 disposed between the upper cover of the main body 1 and the lower cover of the main body 2. A socket hole 11 is formed on the the upper cover 1 of the main body. The device further includes a fuse holder 5 detachably mounted in the lower cover of the main body 2, a fuse tube 6 mounted in the fuse holder 5, a lower conductive piece 7 fixed on the lower cover of the main body 2, and an upper conductive piece 8 fixed between the upper cover of the main body 1 and the lower cover of the main body 2. A mounting frame 51 is formed in the fuse holder 5, and the fuse tube 6 is mounted in the mounting frame 51. The lower conductive piece 7 includes a clamping part 71 of the lower conductive piece capable of clamping and conducting the lower part of the fuse tube 6. The UK-standard pin assembly 4 and the US-standard pin assembly 3 are respectively connected with the lower conductive piece 7 in a plug-in manner. The upper conductive piece 8 includes an clamping part 81 of the upper conductive piece capable of clamping and conducting the upper part of the fuse tube 6. The upper conductive piece 8 is electrically connected to the socket hole 11.

The fuse holder 5 is used for fixing the position of the fuse tube 6, preventing the fuse tube 6 from shifting in the power converter, and more facilitating the clamping of the upper conductive piece 8 and the lower conductive piece 7. It ensures that the fuse tube 6 is in conductive connection with the live wire on the socket hole 11 and the live wire between the UK-standard pin assembly 4 and the US-standard pin assembly 3, and improves the safety of the power converter. After the fuse frame 5 and the fuse tube 6 are mounted in the power converter via the lower cover of the main body 2, the clamping part 81 of the upper conductive piece in the upper conductive piece 8 clamps the upper part of the fuse tube 6, so that one end of the fuse tube 6 is electrically connected to the live wire of the multi-country plug inserted into the socket hole 11. The clamping part 71 of the lower conductive piece in the lower conductive piece 7 clamps the lower part of the fuse tube 6, so that the other end of the fuse tube 6 is connected to the live wire pins of the US-standard pin assembly 3 and the UK-standard pin assembly 4. The two are combined, so that the device is conductive smoothly and has high safety. The circuit in the power converter is effectively protected against overloading. The product volume may be made smaller.

With regard to the specific structural arrangement of the lower conductive piece 7, as shown in FIGS. 1, 3, 9 and 11-14, the lower conductive piece 7 further includes a connection piece 72 of the lower conductive piece, a US-standard clamping part 73 disposed at one end of the connection piece 72 of the lower conductive piece and capable of being inserted and electrically connected to the US-standard pin assembly 3, and a UK-standard clamping part 74 disposed at the other end of the connection piece 72 of the lower conductive piece and capable of being inserted and electrically connected to the UK-standard pin assembly 4. The lower conductive clamp 71 is disposed at the other end of the connection piece 72 of the lower conductive piece. The lower conductive piece 7 is of an integrally formed type structure, so as to ensure degree of conduction fluency between various components and improve the conduction efficiency. One end of the connection piece 72 of the lower conductive piece extends upwards and is connected to the lower end of the clamping part 71 of the lower conductive piece, and the other end is formed with a US-standard clamping part 73 and a UK-standard clamping part 74. When the US-standard pin assembly 3 is required to be used, only the US-standard pin assembly 3 is required to be pushed out of the lower cover of the main body 2 from the power converter. At this time, the US-standard pin assembly 3 is inserted into the US-standard clamping part 73 so as to achieve a conductive connection between the live wire pin on the US-standard pin assembly 3 and the fuse tube 6. When the US-standard pin assembly 3 is not required to be used, the US-standard pin assembly 3 is not connected to the US-standard clamping part 73, effectively ensuring the safety of the use of the US-standard pin assembly 3. When the UK-standard pin assembly 4 is required to be used, only the UK-standard pin assembly 4 is required to be pushed out of the lower cover of the main body 2 from the power converter. At this time, the UK-standard pin assembly 4 is inserted into the UK-standard clamping part 74 so as to achieve a conductive connection between the live wire pin on the UK-standard pin assembly 4 and the fuse tube 6. When the UK-standard pin assembly 4 is not required to be used, the UK-standard pin assembly 4 is not connected to the UK-standard clamping part 74, effectively ensuring the safety of the use of the UK-standard pin assembly 4.

Figure 3:
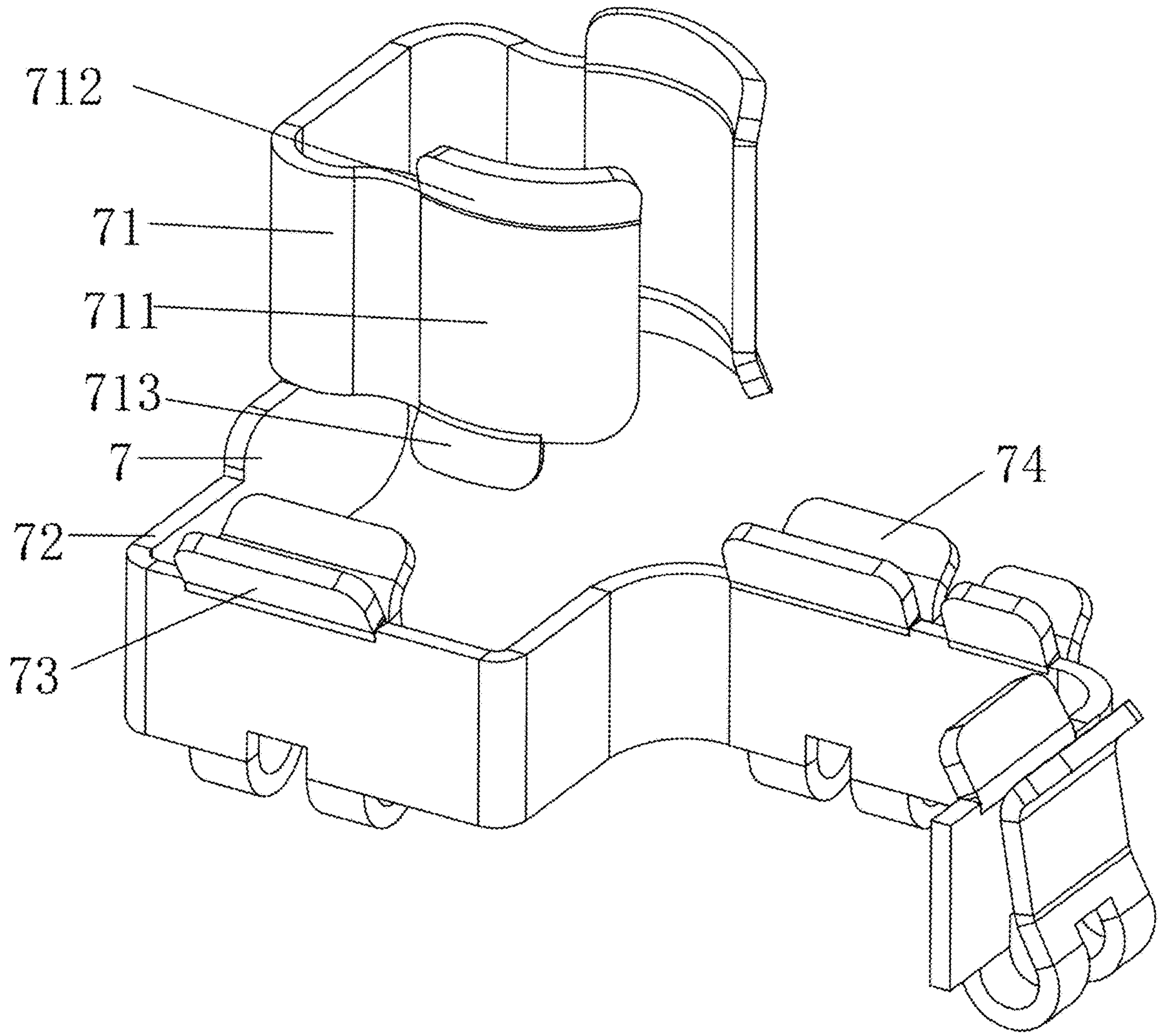
FIG. 3 is a schematic structural view of the lower conductive piece.

With regard to the specific structural arrangement of the connection piece 72 of the lower conductive piece, as shown in FIGS. 1 and 3, the shape of the connection piece 72 of the lower conductive piece may be arranged according to practical requirements. For example, in the present embodiment, the shape of the connection piece 72 of the lower conductive piece is bent to avoid the live wire pin in the UK-standard pin assembly 4.

With regard to the specific structural arrangement of the clamping part 71 of the lower conductive piece, as shown in FIGS. 1 and 3, the clamping part 71 of the lower conductive piece includes a clamping arm of the lower conductive piece 711 which respectively clamps two sides of the lower part of the fuse tube 6. The upper end of the clamping arm of the lower conductive piece 711 is formed with an upper guide block of the lower conductive piece 712 which extends obliquely towards the outer upper end. The lower end of the clamping arm of the lower conductive piece 711 is formed with a lower guide block of the lower conductive piece 713 which extends obliquely towards the outer lower end. Two sets of clamping arms 711 of the lower conductive piece respectively clamp the two sides of the lower part of the fuse tube 6, so as to ensure that the fuse tube 6 is in connection and conduction with the live wires of the UK-standard pin assembly 4 and the US-standard pin assembly 3, preventing the fuse tube 6 from shifting during use, and improving the conduction efficiency. When it is required to pull out the fuse tube 6 and the fuse holder 5 from the power converter, the fuse tube 6 and the fuse holder 5 are pulled out from the clamping part 71 of the lower conductive piece more easily and accurately under the guide action of the upper guide block of the lower conductive piece 712, so as to improve the efficiency of pulling out the fuse tube 6 and the fuse holder 5, and after pulling out, the fuse tube 6 can be freely replaced in the fuse holder 5 for the next use. When it is required to mount the fuse tube 6 and the fuse frame 5 into the power converter, the fuse tube 6 and the fuse frame 5 are more easily and accurately inserted into the clamping part 71 of the lower conductive piece under the guide action of the lower guide block of the lower conductive piece 713, so as to be clamped and conducted by the clamping part 71 of the lower conductive piece, thereby completing the mounting of the fuse tube 6 and improving the efficiency of the mounting of the fuse tube 6 and the fuse frame 5.

With regard to the specific structural arrangement of the upper conductive piece 8, as shown in FIGS. 1, 2 and 9-10, the upper conductive piece 8 further includes a connection piece 82 of the upper conductive piece which is of a "∟" type as a whole, and a socket hole connection clamping part 83 disposed at one end of the connection piece 82 of the upper conductive piece and being electrically connected to the socket hole 11. The clamping part 81 of the upper conductive piece is disposed at the other end of the connection piece 82 of the upper conductive piece. The upper conductive piece 8 is of an integrally formed type structure, so as to ensure degree of conduction fluency between various components and improve the conduction efficiency. The connection piece 82 of the upper conductive piece has a "∟" structure, and may effectively reserve a fixing position for the upper conductive piece 8, so that screws may fix the upper conductive piece 8 on the internal parts of the power converter (for example, fixing same on a lower end face of a support in a protection door assembly for preventing single insertion of a multi-country power converter with the patent number being 202021218777.2). The clamping part 81 of the upper conductive piece is disposed at one end of the upper conductive connecting piece 82 extending upwards and extending integrally downwards so as to clamp the fuse tube 6. The socket hole 11 connection clamping part is disposed at one end of the upper conductive connecting piece 82 in the transverse direction and extending integrally upwards, correspondingly conductive to a conductive elastic piece corresponding to the socket hole 11 (for example, the US201621114014.7, and the patent title of a Right Socket Elastic Piece Assembly in a Multi-country Power Converter, namely, one end of the right socket elastic piece assembly extending downwards is inserted into the socket hole 11 connection clamping part), thereby achieving conduction between the multi-country plug inserted into the socket hole 11 and the respective pin assembly.

Figure 8:
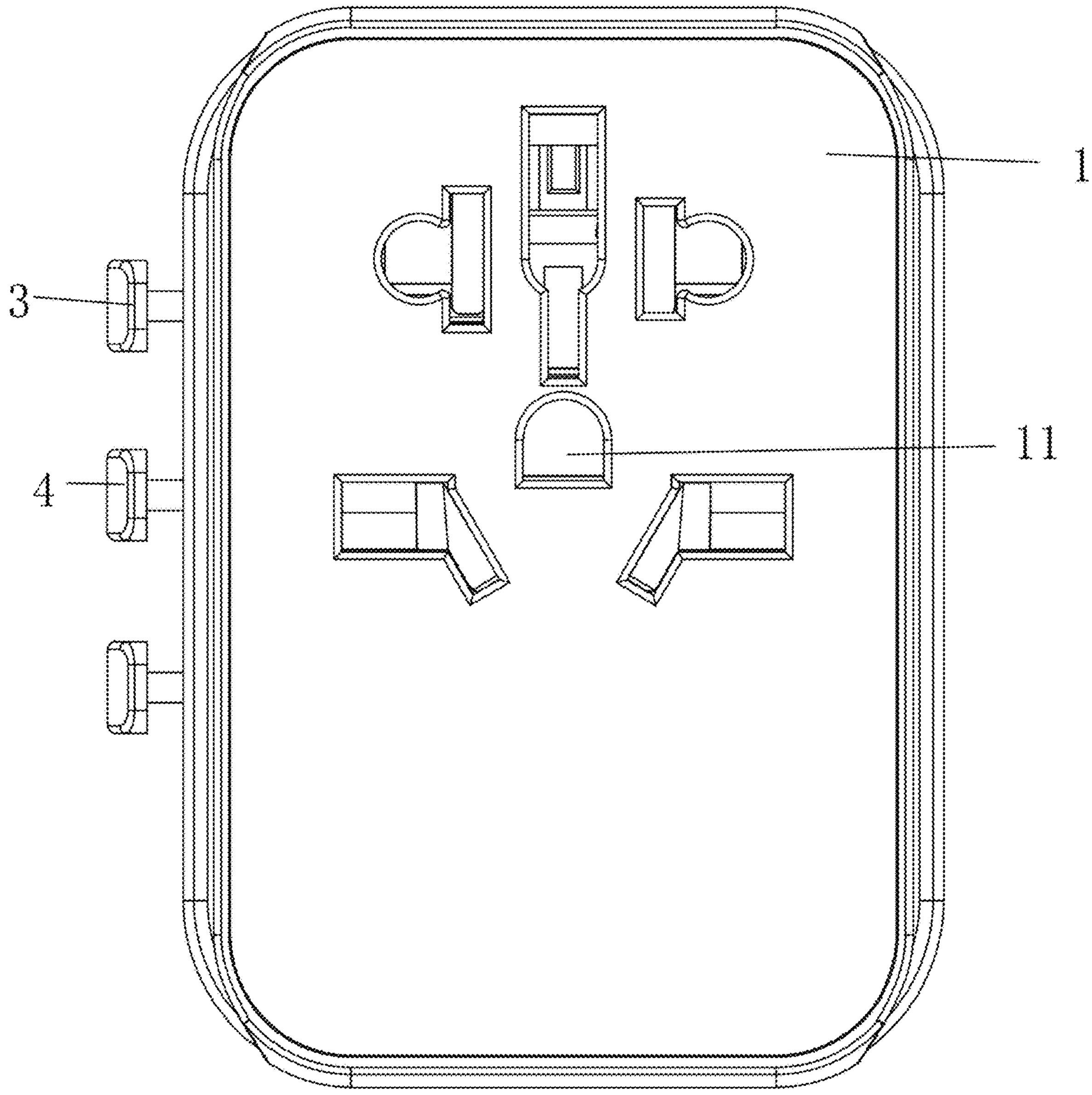
FIG. 8 is a schematic front view of the power converter.
Figure 9:
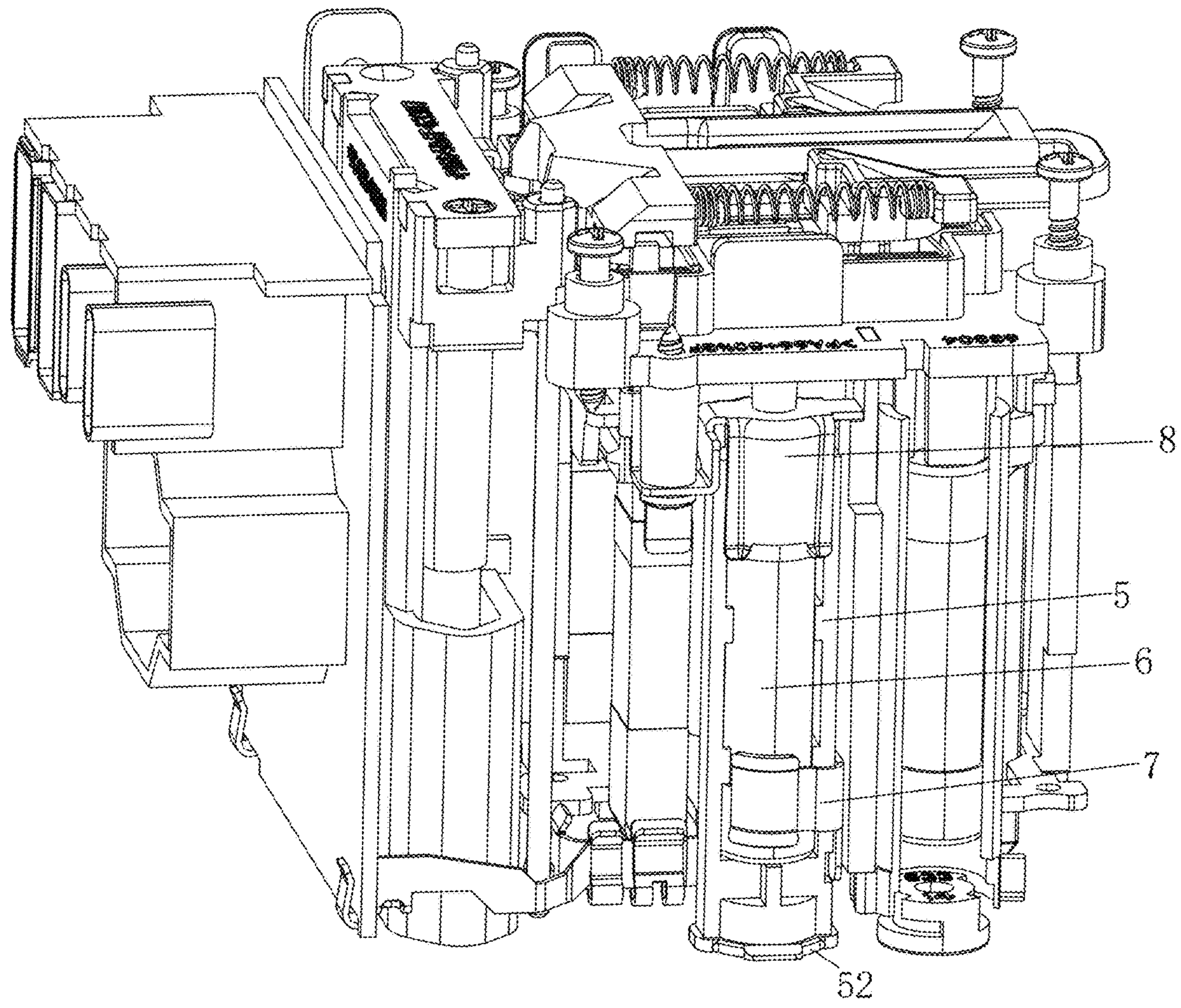
FIG. 9 is a schematic view showing an internal structure of the power converter.
Figure 10:
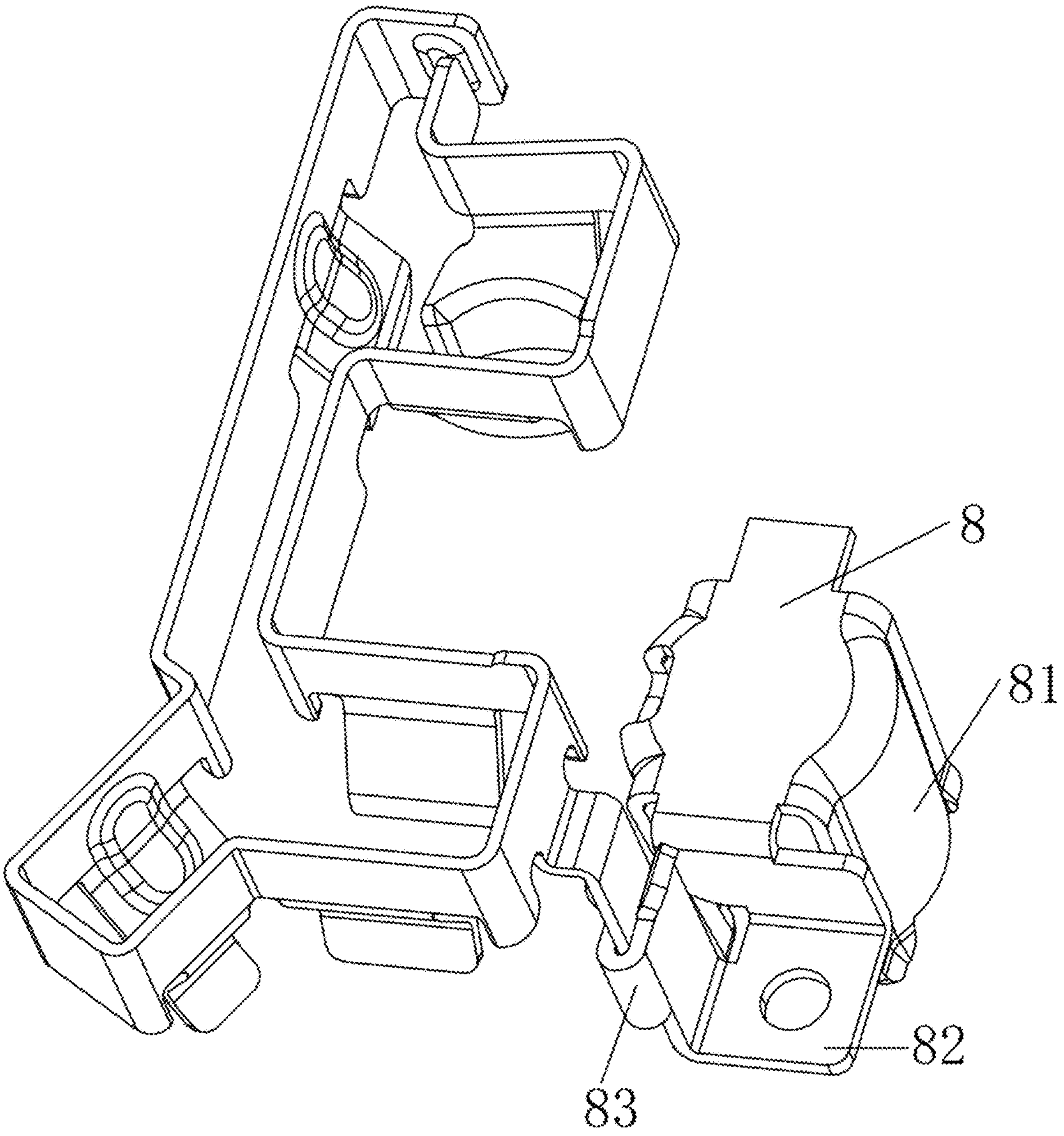
FIG. 10 is a schematic view showing the connection between a conductive elastic piece and the upper conductive piece.

With regard to the specific structural arrangement of the socket holes 11, as shown in FIG. 8, reference can be made to Patent No. 201621114014.7, entitled A Multi-national Power Converter, regarding the structure of a single socket panel or a combined socket panel and the description of the relevant principles, which will not be repeated in this embodiment.

With regard to the specific structural arrangement of the clamping part 81 of the upper conductive piece, as shown in FIGS. 1, 2 and 9-10, the clamping part 81 of the upper conductive piece includes a clamping arm 811 of the upper conductive piece respectively clamping two sides of the upper part of the fuse tube 6 and extending integrally downwards. The lower part of the clamping arm 811 of the upper conductive piece is formed with at least one guide block of the upper conductive piece 812 extending obliquely towards the outer lower end. Two sets of clamping arms 811 of upper conductive piece clamp the upper part of the fuse tube 6 so as to perform connection and conduction of the fuse tube 6 to the live wire on the socket hole 11 in the power converter. When it is required to mount the fuse tube 6 and the fuse holder 5, the upper end of the fuse tube 6 first contacts the guide block of the upper conductive piece 812, and the fuse tube 6 is inserted into the clamping arm 811 of the upper conductive piece under the guide action of the guide block of the upper conductive piece 812, so that the fuse tube 6 is easier and more accurate to be inserted into the clamping part 81 of the upper conductive piece to prevent displacement, and is clamped and conducted by the clamping part 81 of the upper conductive piece to complete the mounting of the fuse tube 6 and improve the mounting efficiency.

Figure 2:
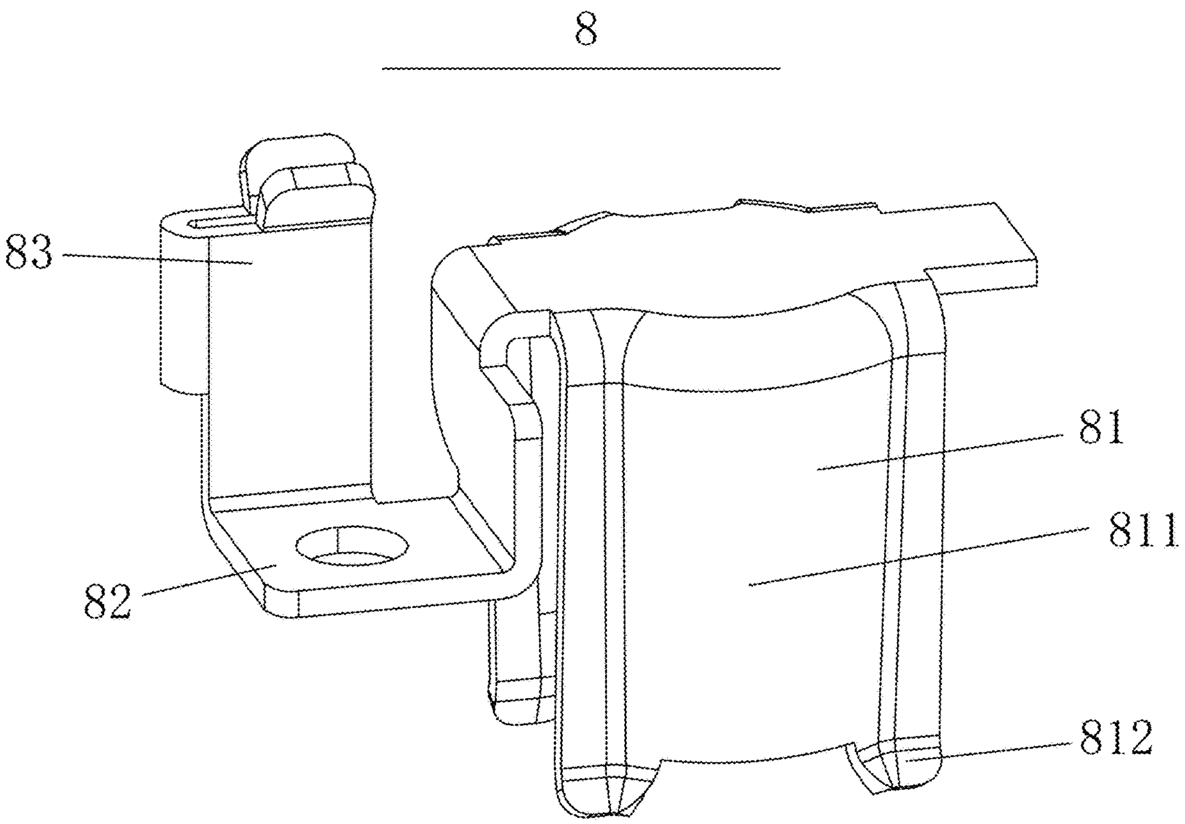
FIG. 2 is a schematic structural view of the upper conductive piece.

Specifically, as shown in FIGS. 1 and 2, a guide block 812 of the upper conductive piece is respectively formed on two sides of the lower part of the clamping arm 811 of the upper conductive piece. A total of four guide blocks 812 of the upper conductive piece guide all four corners of the fuse tube 6, so that the fuse tube 6 is inserted into the middle part of the clamping part 81 of the upper conductive piece more precisely to complete the conduction and connection.

With regard to the specific method for mounting the fuse holder 5 and the fuse tube 6 in the power converter, as shown in FIGS. 1, 4 and 6-7, a mounting cover 52 is formed on the lower end surface of the fuse holder 5. At least one mounting limiting part 521 extends outwards on the side edge of the mounting cover 52. A pull-out guide surface 522 extending obliquely outwards and downwards from the mounting plate is formed on the upper end surface of the mounting limiting part 521. The lower cover 2 of the main body is provided with a fuse tube insertion hole 21 matched with the mounting cover 52 and the mounting limiting part 521. At least one pulling-out avoidance groove 22 is recessed on a side edge of the fuse tube insertion hole 21. The fuse holder 5 and the fuse tube 6 are inserted into the power converter via the fuse tube insertion hole 21. The mounting limit part 521 is pressed against the side edge of the fuse tube insertion hole 21, thereby preventing the fuse tube 6 from being excessively inserted into the power converter. When it is necessary to pull out the fuse tube 6, it is only necessary to insert a hand or an article between the pulling-out avoidance groove 22 and the pull-out guide surface 522, and then lift the mounting limit part 521 along the extension direction of the pull-out guide surface 522, so as to pull out the fuse holder 5 and the fuse tube 6 mounted in the fuse holder 5. The whole process is simple and convenient, and the efficiency of pull-out is improved.

Figure 4:
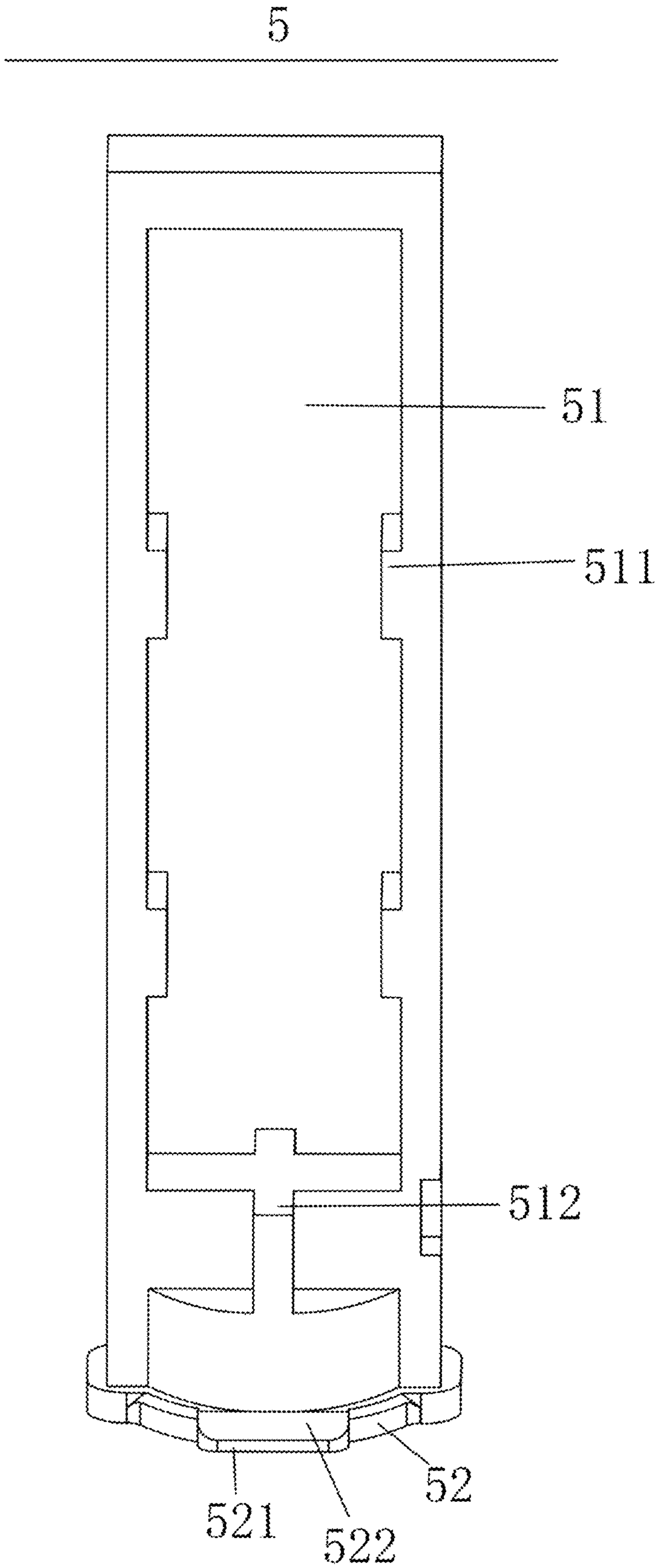
FIG. 4 is a schematic structural view of the fuse holder.
Figure 5:
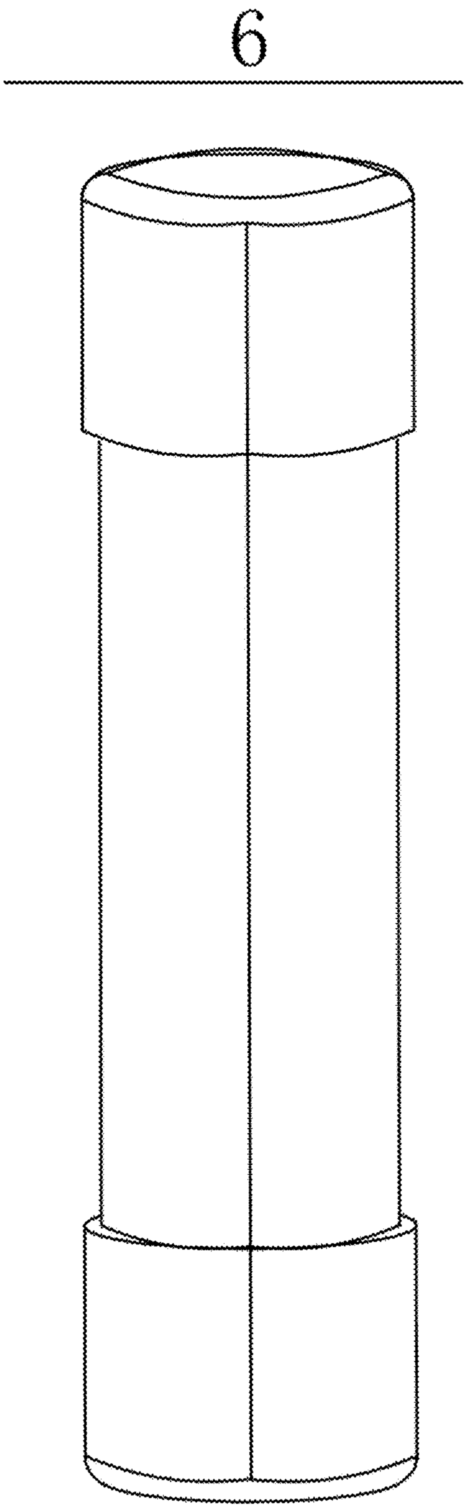
FIG. 5 is a schematic structural view of the fuse tube.
Figure 6:
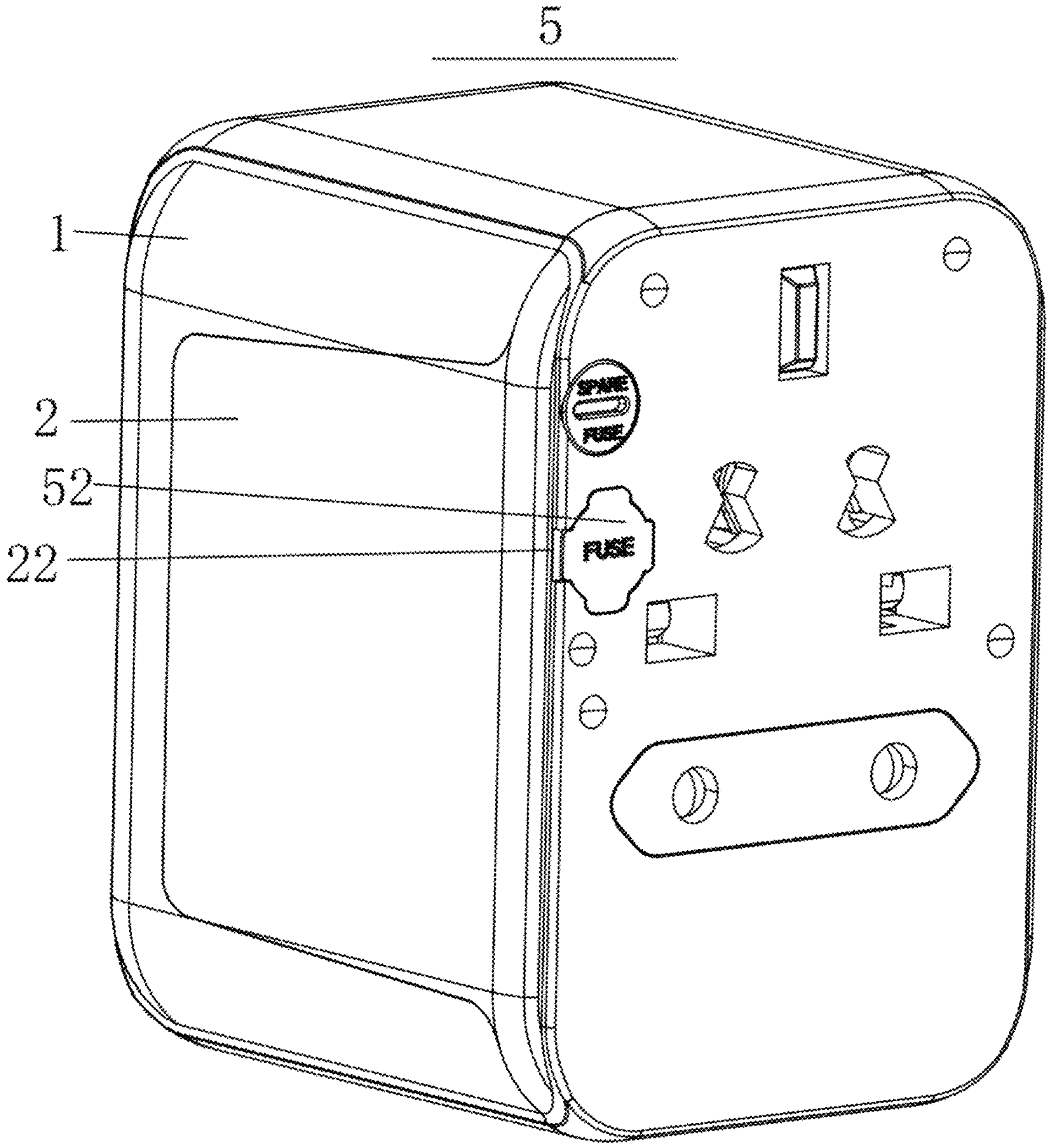
FIG. 6 is a schematic view of a back side of the power converter.
Figure 7:
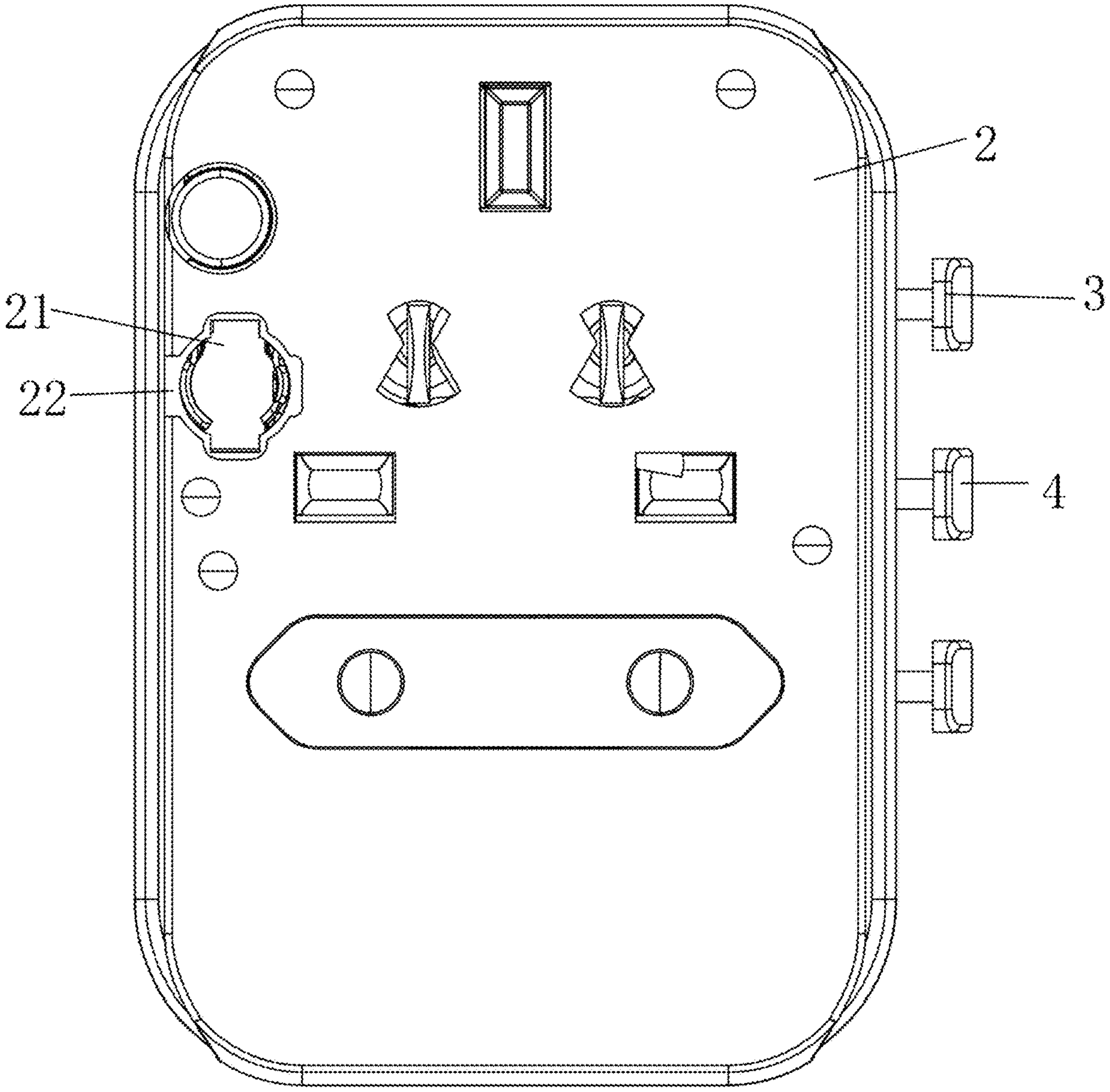
FIG. 7 is a schematic view of the back side of the power converter with the fuse tube and the fuse holder removed.

With regard to the mounting frame 51, as shown in FIGS. 4 and 5, the overall shape of the mounting frame 51 is a rectangle or a circular arc, and the specific selection thereof may be made according to actual situations. In the present embodiment, the rectangle is selected to match the fuse tube 6.

With regard to the specific method for mounting the fuse tube 6 in the mounting frame 51, as shown in FIG. 4, at least one set of inner limit protrusions 511 arranged symmetrically protrude on the inner wall of the mounting frame 51, and the side edge of the fuse tube 6 presses against the inner limit protrusions 511. A lower limit protrusion 512 protrudes at two ends of the outer side of the lower part of the mounting frame 51 respectively, and the lower end of the fuse tube 6 presses against the lower limit protrusion 512. The two are combined together, so that the fuse tube 6 is stably fixed in the mounting frame 51 and cannot be easily displaced. Thus, the device is conductive smoothly and has high safety. The circuit in the power converter is effectively protected against overloading.

Figure 11:
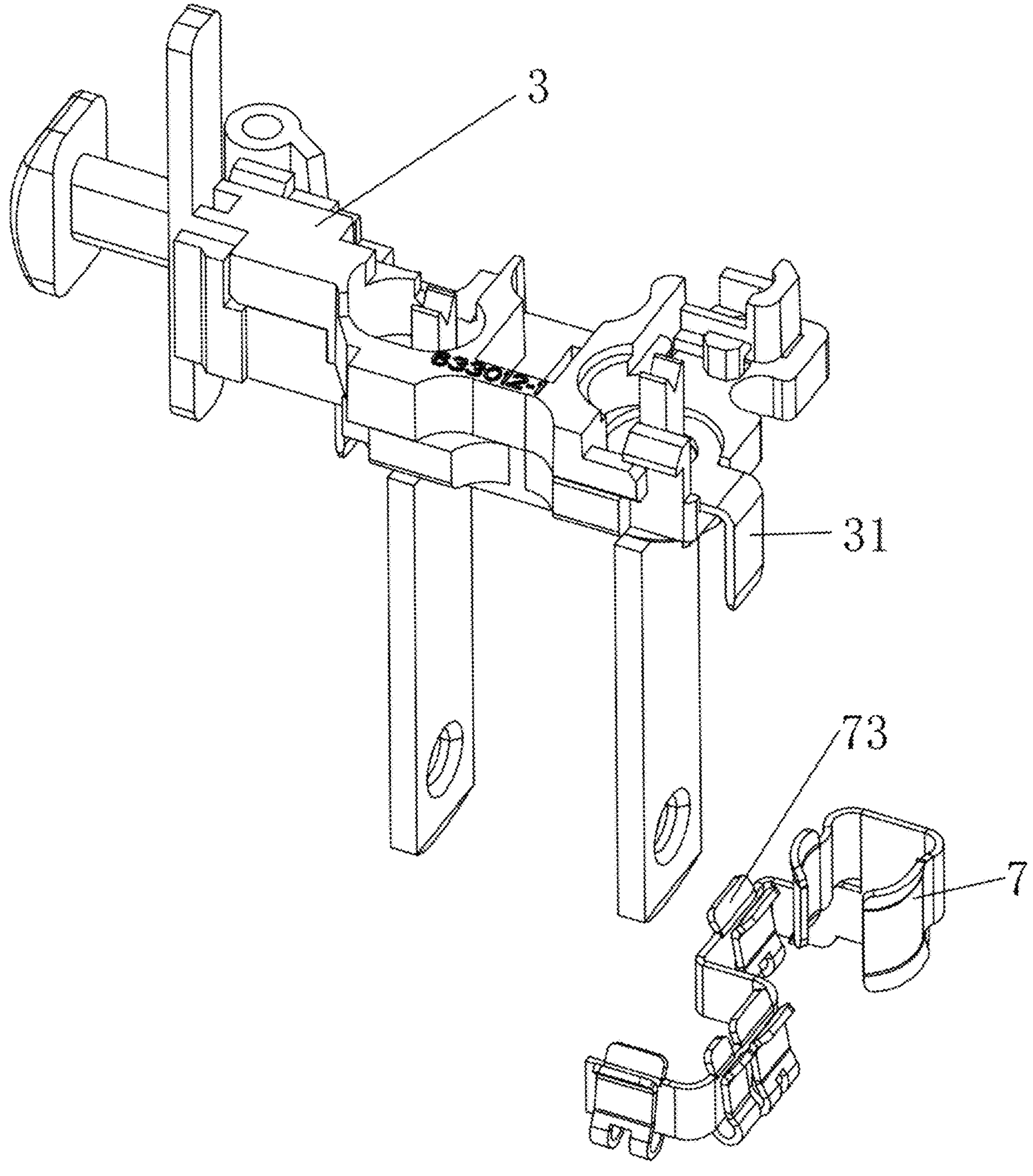
FIG. 11 is a schematic view of a US standard of pin assembly and the lower conductive piece.
Figure 12:
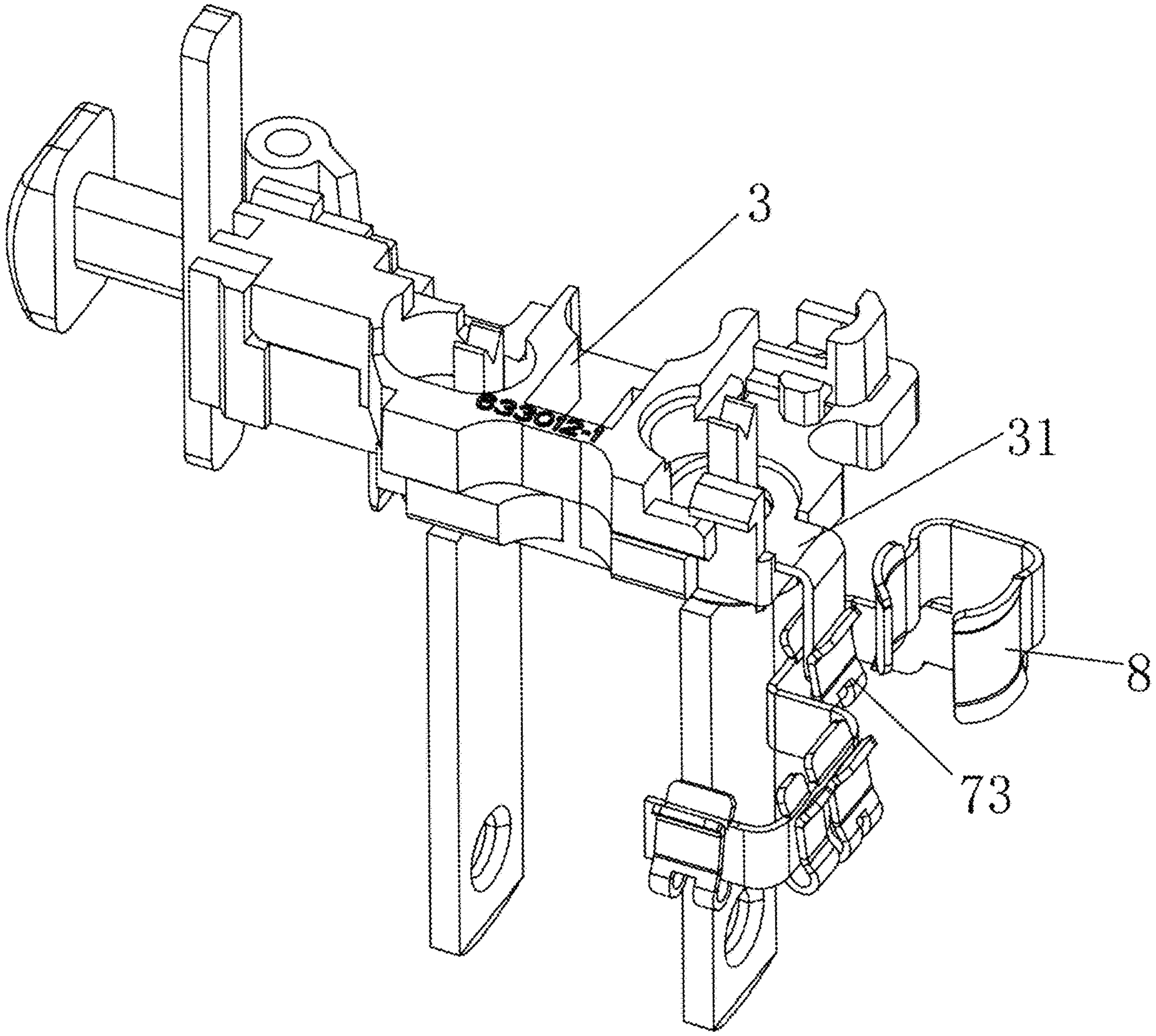
FIG. 12 is a schematic view of a US standard of pin assembly inserted into the lower conductive piece.

With regard to the specific plug-in mode of the US-standard pin assembly 3 and the lower conductive piece 7, as shown in FIGS. 11 and 12, a US-standard live wire conductive piece 31 is disposed on the US-standard pin assembly 3, and the US-standard live wire conductive piece 31 is inserted into the US-standard clamping part 73 when the US-standard pin assembly 3 is pushed out of the lower cover of the main body 2, so that the US-standard pin assembly 3 is conductively connected to the lower conductive piece 7, the lower conductive piece 7 is conductively connected to the fuse tube 6, and the upper end of the fuse tube 6 is conductively connected to the upper conductive piece 8, and the upper conductive piece 8 is conductively connected to the conductive elastic piece on the support. After the multi-country plug to be converted is inserted into the socket hole 11, the multi-country plug conducts with the conductive elastic piece, and the whole conduction structure is complete and the conduction is smooth. When it is not required to be used, the US-standard live wire conductive piece 31 is far away from the US-standard clamping part; 73, so as to ensure that the US-standard live wire conductive piece 31 is connected and conducted with the external plug, thereby improving the safety of the power converter. With regard to the specific structural arrangement of the US-standard pin assembly 3, reference can be made to Patent No. 202010597132.2, namely, a multi-way sliding type small plug, regarding the structure of the second pin and the use of a distance, etc. so that the description thereof will not be repeated in this embodiment.

Figure 13:
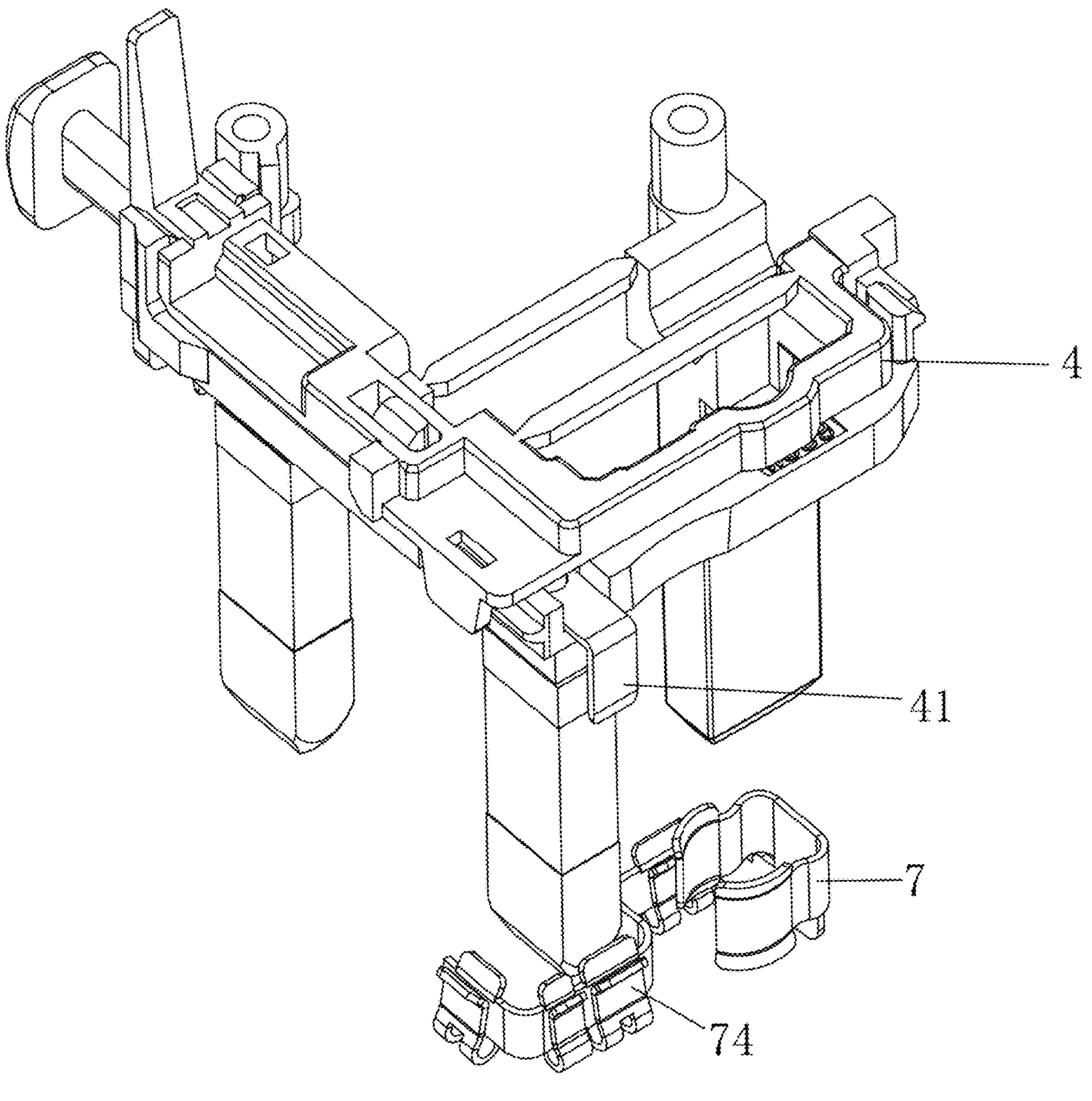
FIG. 13 is a schematic view of a UK standard of pin assembly and a lower conductive piece.
Figure 14:
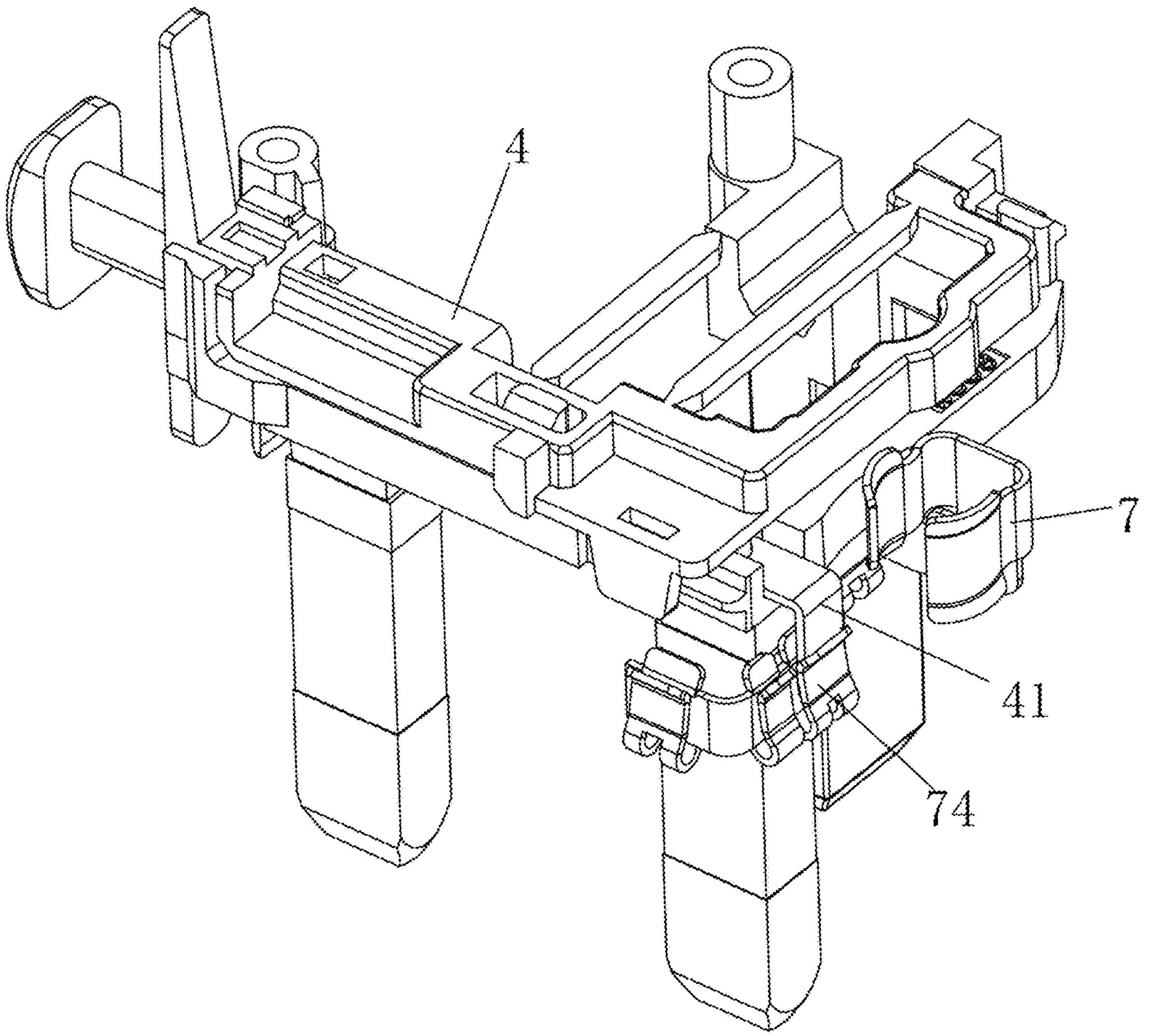
FIG. 14 is a schematic view of a UK standard of pin assembly inserted into the lower conductive piece.
Figure 15:
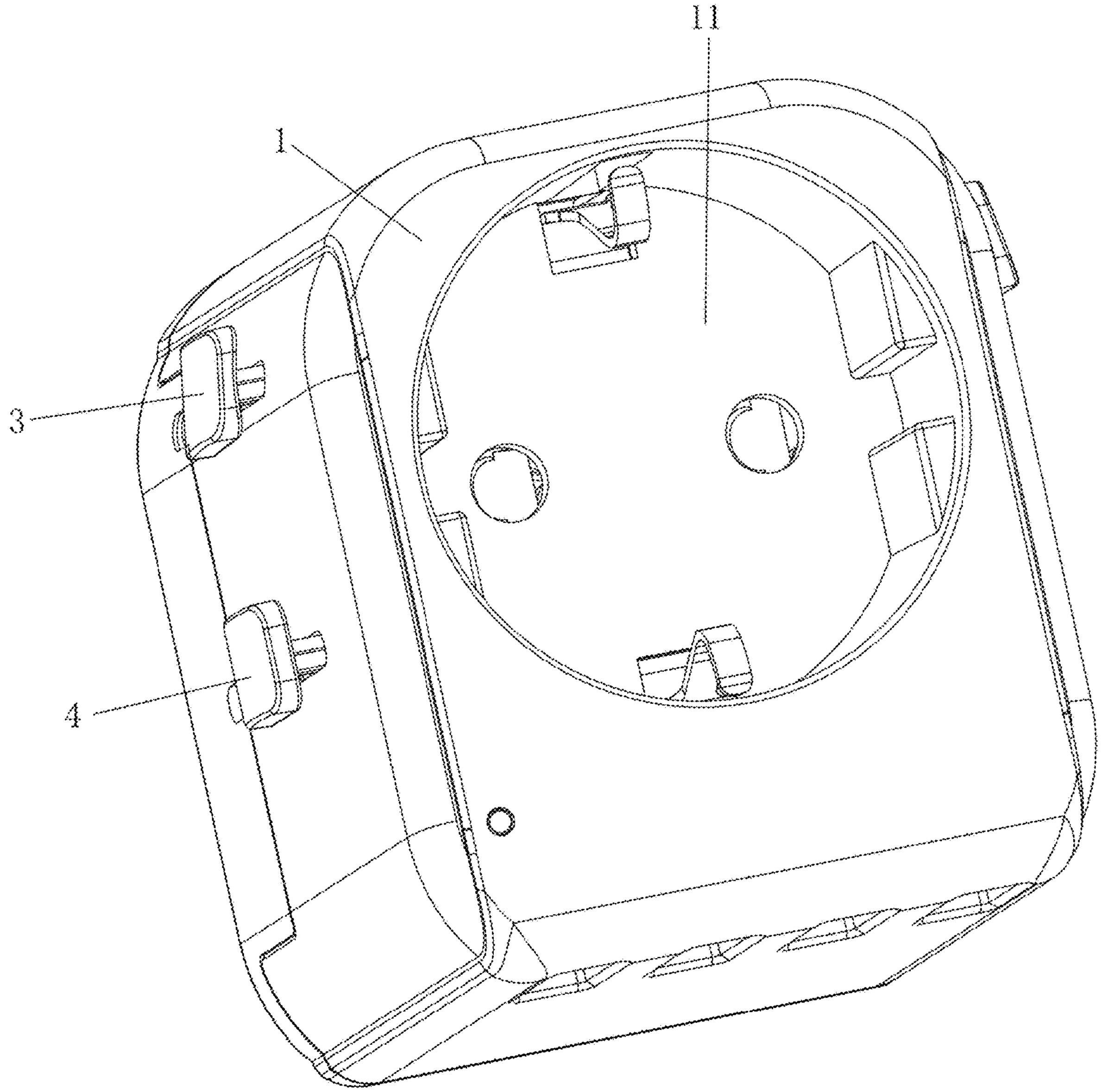
FIG. 15 is a schematic diagram of Example 2.

With regard to the specific plug-in mode of the pin assembly 4 and the lower conductive piece 7, as shown in FIGS. 13 and 14, the UK-standard pin assembly 4 is provided with a UK-standard live wire conductive piece 41. The UK-standard live wire conductive piece 41 is inserted into the UK-standard clamping part 74 when the UK-standard pin assembly 4 is pushed out of the lower cover of the main body 2, so that the UK-standard pin assembly 4 is in conduction and connection with the lower conductive piece 7, the lower conductive piece 7 is in conduction and connection with the fuse tube 6, the upper end of the fuse tube 6 is in conduction and connection with the upper conductive piece 8, and the upper conductive piece 8 is in conduction and connection with the conductive elastic piece on the support. After the multi-country plug to be converted is inserted into the socket hole 11, the multi-country plug conducts with the conductive elastic piece, and the whole conduction structure is complete and the conduction is smooth. When it is not required to be used, the UK-standard live wire conductive piece 41 is far away from the UK-standard clamping part 74, thereby ensuring that the UK-standard live wire conductive piece 41 is connected and conducted with the external plug, and improving the safety of the power converter. With regard to the specific structural arrangement of the pin assembly 4, reference can be made to Patent No. 202010597132.2, namely, a multi-way sliding type small plug, regarding the structure of the second pin and the use of a distance, etc., which will not be repeated in this embodiment.

Embodiment 2

In Embodiment 1, the structure of the overload prevention device is described. In this embodiment, the differences from the other embodiments are mainly described, and the description of the same structure will not be repeated in this embodiment.

The main difference between Embodiment 2 and Embodiment 1 is that the socket hole 11 in this embodiment is a German socket panel, so as to meet the requirements of different sockets in different situations, improve the practicality of the device and expand the scope of application of the device. The German socket panel is a standard panel and will not be described in detail in this embodiment.

It should be noted herein that the overload prevention device for the multi-country power converter disclosed in the present utility model improves the specific structure, but the specific control mode is not an innovative point of the present utility model. With regard to the fuse tube, the conductive elastic piece and other components involved in the present utility model, they can be common standard components or components known to a person skilled in the art. The structure, principle and control method thereof are all known to a person skilled in the art by a technical manual or through conventional experimental methods.

In the description above, only the preferred embodiments of the present utility model has been described, and the technical scope of the present utility model is not limited in any way. Therefore, other structures obtained by adopting the same or similar technical features as those of the above embodiments of the present utility model are within the scope of the present utility model.

The invention claimed is:

1. An overload prevention device for a multi-country power converter, comprising an upper cover of a main body, a lower cover of the main body covered on the upper cover of the main body, a US-standard pin assembly disposed between the upper cover of the main body and the lower cover of the main body, and a UK-standard pin assembly disposed between the upper cover of the main body and the lower cover of the main body, wherein at least one socket hole is formed on the upper cover of the main body, characterized in that the device further comprises a fuse holder detachably mounted in the lower cover of the main body, a fuse tube mounted in the fuse holder, a lower conductive piece fixed on the lower cover of the main body, and an upper conductive piece fixed between the upper cover of the main body and the lower cover of the main body; a mounting frame is formed in the fuse holder, and the fuse tube is mounted in the mounting frame; the lower conductive piece comprises a clamping part of the lower conductive piece capable of clamping and conducting the lower part of the fuse tube; the UK-standard pin assembly and the US-standard pin assembly are respectively connected with the lower conductive piece in a plug-in manner; the upper conductive piece comprises an clamping part of the upper conductive piece capable of clamping and conducting the upper part of the fuse tube; the upper conductive piece is electrically connected to the socket hole; a mounting cover is formed on a lower end surface of the fuse holder, at least one mounting limit part extends outwards on a side edge of the mounting cover, and a pull-out guide surface extending obliquely outwards and downwards from the mounting plate is formed on an upper end surface of the mounting limit part; the lower cover of the main body is provided with a fuse tube insertion hole matched with the mounting cover and the mounting limit part, and at least one pulling-out avoidance groove is recessed on a side edge of the fuse tube insertion hole; and the mounting frame has a rectangular or circular arc shape as a whole.

2. The overload prevention device for the multi-country power converter according to claim 1, characterized in that the clamping part of the lower conductive piece comprises a clamping arm of the lower conductive piece which respectively clamps two sides of the lower part of the fuse tube; the upper end of the clamping arm of the lower conductive piece is formed with an upper guide block of the lower conductive piece which extends obliquely towards the outer upper end; and the lower end of the clamping arm of the lower conductive piece is formed with a lower guide block of the lower conductive piece which extends obliquely towards the outer lower end.

3. The overload prevention device for the multi-country power converter according to claim 1, characterized in that the upper conductive piece further comprises a connection piece of the upper conductive piece which is of a “L” type as a whole, and a socket hole connection clamping part disposed at one end of the connection piece of the upper conductive piece and being electrically connected to the socket hole; and the clamping part of the upper conductive piece is disposed at the other end of the connection piece of the upper conductive piece.

4. The overload prevention device for the multi-country power converter according to claim 1, characterized in that the clamping part of the upper conductive piece comprises an clamping arm of the upper conductive piece respectively clamping two sides of the upper part of the fuse tube and extending integrally downwards; and the lower part of the clamping arm of the upper conductive piece is formed with at least one guide block of the upper conductive piece extending obliquely towards the outer lower end.

5. The overload prevention device for the multi-country power converter according to claim 1, characterized in that the inner wall of the mounting frame is convexly provided with at least one set of inner limit protrusions arranged symmetrically; a side edge of the fuse tube presses against the inner limit protrusion; a lower limit protrusion is respectively protruded at two ends of the outer side of the lower part of the mounting frame; and the lower end of the fuse tube presses against the lower limit protrusion.

6. The overload prevention device for the multi-country power converter according to claim 1, characterized in that the lower conductive piece further comprises a connection piece of the lower conductive piece, a US-standard clamping part disposed at one end of the connection piece of the lower conductive piece and capable of being inserted and electrically connected to the US-standard pin assembly, and a UK-standard clamping part disposed at the other end of the connection piece of the lower conductive piece and capable of being inserted and electrically connected to the US-standard pin assembly; and the clamping part of the lower conductive piece is disposed at the other end of the connection piece of the lower conductive piece.

7. The overload prevention device for the multi-country power converter according to claim 6, characterized in that a US-standard live wire conductive piece is disposed on the US-standard pin assembly; and the US-standard live wire conductive piece is inserted into the US-standard clamping part when the US-standard pin assembly is pushed out of the lower cover of the main body.

8. The overload prevention device for the multi-country power converter according to claim 6, characterized in that a UK-standard live wire conductive piece is disposed on the UK-standard pin assembly; and the UK-standard live wire conductive piece is inserted into the UK-standard clamping part when the UK-standard pin assembly is pushed out of the lower cover of the main body.

* * * * *